L. Yale, Jr.
Vise.

N° 74025. Patented Feb. 4, 1868.

Witnesses
John B. Yale
Ira L. Cady

Inventor
Linus Yale Jr.

United States Patent Office.

LINUS YALE, JR., OF SHELBURNE FALLS, MASSACHUSETTS.

Letters Patent No. 74,025, dated February 4. 1868.

IMPROVEMENT IN VISES.

*The Schedule referred to in these Letters Patent and making part of the same.*

TO ALL WHOM IT MAY CONCERN:

Be it known that I, LINUS YALE, Jr., of Shelburne Falls, in the county of Franklin, and State of Massachusetts, have invented a new and useful Improvement in Vises; and the following, taken in connection with the drawings, is a full, clear, and exact description thereof.

The drawings represent some of the forms in which my invention has been reduced to practice, and other forms will be referred to in the course of this description. In the drawings—

The nature of my invention consists in so combining a spring with the jaws of a vise, and the screw and nut thereof, that an article may be clasped between the jaws either by the force of a spring or by the whole power of the screw, substantially as hereafter described.

Figure 1:
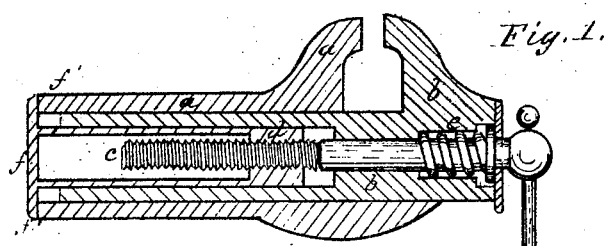
Figures 1 and 2 are both vertical longitudinal sections through a parallel vise, with my improvement applied thereto.
Figure 2:
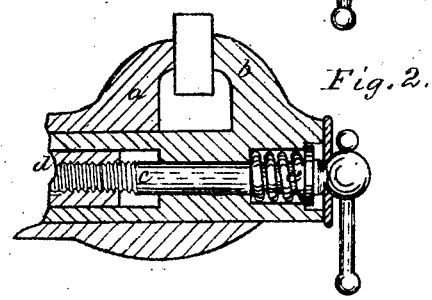

In the drawings, the stationary jaw of the vise is represented at $a\ a$, the moving jaw at $b\ b$, the screw at $c$, and the nut at $d$. Around the stem or shank of the screw of figs. 1 and 2 is coiled a spiral spring, $e$, and this spring bears against the moving jaw and the collar secured to the screw. When the vise has no article clamped between its jaws, the moving jaw will bear the relation or occupy the relative position in relation to the screw and collar shown in fig. 1, and will move towards and away from the stationary jaw as the screw is turned, with the spring always expanded. When one or more articles are placed between the jaws, and the screw is turned in the direction to clamp them, then, as soon as both jaws bear upon the articles lying between them, the screw begins to compress the spring, and the articles are held by a greater or less spring-pressure, depending upon the strength of the spring, and the number of revolutions of the screw made after the jaws have come in contact with the articles grasped between them. A continued turning of the screw in the same direction will cause the spring to be so compressed that the collar attached to the screw will bear against the moving jaw, (see fig. 2,) and then the article is clamped, as in an ordinary vise, by the whole power of the screw.

This capacity of my improved vise to clamp with various degrees of force is, as I have found by trial, of great value, and especially in filing articles to a pattern. In that case the article and pattern are both put between the jaws and clamped by the spring-pressure, and then accurately adjusted, both in relation to the jaws and each other, by turning them in the gripe of the jaws, and then finally clamped securely enough for filing by a continued revolution of the screw.

Figure 3:
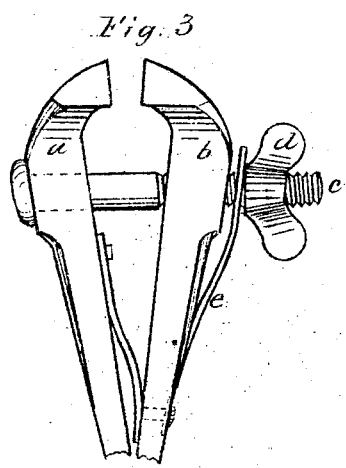
Figure 3 is a partial elevation of a hand-vise.
Figure 4:
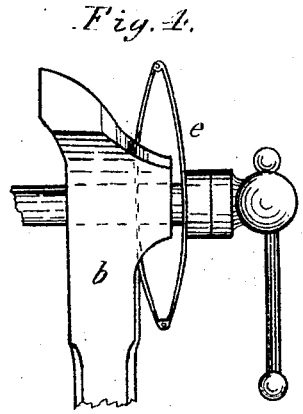
Figure 4 is a partial elevation of an ordinary bench-vise, both having my improvement applied thereto.

My invention does not reside in any particular form of vise, for it may be applied equally as well to the ordinary as to the parallel vise; nor does it consist in any special kind of spring, for I intend to use any proper kind or form of spring, of any proper material, applying it as in fig. 3, between a nut and a jaw, or as in fig. 4, which represents a portion of a common bench-vise between the jaw and the collar. The location of the spring is, moreover, immaterial, as I sometimes intend to apply it between the nut and the stationary jaw, one way of doing which would be to slot the tube surrounding the nut $d$, figs. 1 and 2, and to pass through that slot two arms attached to the stationary jaw, then to locate the nut between these jaws, with a spring between its face nearest the moving jaw and the arm which is nearest the same jaw. Another way of locating the spring between the nut and stationary jaw is, to apply a spring between the collar or flange $f$, figs. 1 and 2, attached to the nut-supporting tube and the rear ends of the stationary jaw at $f'\ f'$.

I have also applied a spring in combination with my new parallel vise, for which an application for a patent is now pending, substantially in the manner and to produce the effects herein described.

Other formal changes in my combination might be described, but sufficient has been stated to enable the intelligent mechanic to construct my invention under various forms, and to prove that the form and arrangement of my combination may be variously modified without departing from the principle of my invention.

I claim, as of my own invention, the combination of a spring with the jaws, nut, and screw of a vise, substantially in the manner and operating as specified.

LINUS YALE, JR.

Witnesses:
JOHN B. YALE,
IRA L. CADY.